United States Patent [19]
Yamazaki et al.

[11] Patent Number: 5,639,536
[45] Date of Patent: Jun. 17, 1997

[54] METHOD OF FORMING IMPROVED MATTED SURFACE-FINISHED ARTICLE BY USE OF TRANSFER MEMBER, AND ARTICLE FORMED THEREBY

[75] Inventors: Seiichi Yamazaki; Naoto Toyooka, both of Kyoto, Japan

[73] Assignee: Nissha Printing Co., Ltd., Kyoto, Japan

[21] Appl. No.: 308,958

[22] Filed: Sep. 20, 1994

Related U.S. Application Data

[63] Continuation of Ser. No. 26,173, Mar. 1, 1993, abandoned, which is a continuation of Ser. No. 730,896, filed as PCT/JP89/01209, Dec. 1, 1989, published as WO91/08096, Jun. 13, 1991, abandoned.

[51] Int. Cl.$^6$ ............................. B29C 45/14; B32B 3/30
[52] U.S. Cl. ............................. 428/141; 428/79; 428/156; 428/161; 428/172; 428/352; 428/343; 428/347; 428/914; 264/257; 264/266; 264/274; 264/316; 156/232
[58] Field of Search ............................. 428/79, 141, 156, 428/161, 172, 352, 343, 347, 914; 264/257, 266, 274, 316; 156/232

[56] References Cited

U.S. PATENT DOCUMENTS

| | | | |
|---|---|---|---|
| 4,160,798 | 7/1979 | Price et al. | 264/213 |
| 4,183,991 | 1/1980 | Smiley et al. | 428/220 |
| 4,229,497 | 10/1980 | Piazza | 428/71 |
| 4,544,578 | 10/1985 | Duane, Jr. | 427/140 |
| 4,925,728 | 5/1990 | Crass et al. | 428/216 |
| 5,000,990 | 3/1991 | Freeman | 428/36.1 |

FOREIGN PATENT DOCUMENTS

| | | |
|---|---|---|
| 0-311-079 | 4/1989 | European Pat. Off. . |
| 55-15888 | 2/1980 | Japan . |
| 56-109718 | 8/1981 | Japan . |
| 57-150551 | 9/1982 | Japan . |
| 57-129731 | 11/1982 | Japan . |
| 59-202832 | 11/1984 | Japan . |
| 62-256620 | 11/1987 | Japan . |
| 63-91215 | 4/1988 | Japan . |
| 63-224918 | 9/1988 | Japan . |
| 1-301316 | 5/1989 | Japan . |
| 1-295812 | 11/1989 | Japan . |

*Primary Examiner*—William Watkins
*Attorney, Agent, or Firm*—Wenderoth, Lind & Ponack

[57] ABSTRACT

An in-mold molded product includes a molded plastic member having projections and recesses on a surface thereof and a transfer layer provided on such surface. The outer surface of the transfer layer has a contour corresponding to the projections and recesses of the plastic member and additionally has projections and recesses that are finer than those on the surface of the plastic molded member. Thus, the finished product has a matte surface with good wear characteristics. The product is molded by arranging a mat transfer member at a predetermined region of a cavity of a mold unit, the mat transfer member having the fine projections and recesses on one surface thereof, and a portion of the mold unit defining the cavity having, at the predetermined region, projections and recesses which are larger in size than those of the mat transfer member. Plastic is injected into the cavity in a direction to urge the mat transfer member against the portion of the mold unit having the larger projections and recesses thus molding the molded product.

14 Claims, 3 Drawing Sheets

METHOD OF FORMING IMPROVED MATTED SURFACE-FINISHED ARTICLE BY USE OF TRANSFER MEMBER, AND ARTICLE FORMED THEREBY

This is a continuation of application Ser. No. 08/026,173 filed Mar. 1, 1993, now abandoned, that is a continuation of application Ser. No. 07/730,896, filed as PCT/JP89/01209, Dec. 1, 1989 published as WO91/08096, Jun. 13, 1991, now abandoned.

BACKGROUND OF THE INVENTION

The present invention relates to an in-mold molded project with a matted surface that defines a lusterless finish and that is resistant to damage and stain because of an excellent matted effect produced in a so-called in-mold molding operation, and to a method for manufacturing the in-mold molded product.

Conventionally, methods which are available for manufacturing molded products having matted surfaces are as follows:

(1) In one method, the surface of a molded product is locally masked, and then either matting paint or surface-lustering paint is applied to the surface of the molded product by a spray coating process to obtain a product which is locally provided with both matted and lustered regions. If the molded product is to include a superficial design such as characters or a pattern, a further process such as screen printing, plug printing, or hot-stamping must be executed. On the other hand, if the molded product has a complex surface with projections and recesses, then it is difficult to mask such surface to prevent the coated paint from infiltrating the masked regions. Thus, the masking process takes much time and results in the impossibility of utilizing mass production. Therefore, application of this method is limited to the production of those molded products having a simple configuration close to planar.

(2) A second conventional method separately constructs matted and lustered component parts. For example, lustered component parts are made of polyvinyl chloride sheets, metallic parts, or resin-molded parts. On the other hand, those component parts to be provided with a lusterless or matted surface are produced by a mold unit having a grained surface. Finally, these component parts are integrated into a complete product locally having matted and lustered regions. Thus, this conventional method can only be employed for the production of those molded products having a simple configuration, and therefore freedom of design is restrained. In addition, production of the product involves a high cost on the part of the manufacturer.

There is also an in-mold molding method available for the production of molded products having matted surfaces. This method involves the following steps.

First, a mat transfer member capable of forming fine projections and recesses for producing a matted effect is secured at a predetermined position inside of an injection mold unit. Next, the mold unit is closed and resinous material is injected therein to cause the mat transfer member to tightly adhere to the surface of the molded member simultaneously with the formation thereof. Finally, a substrate sheet of the mat transfer member is stripped off, thereby to result in the molded product.

Substantially, the mat transfer member is composed of either of the following: a transfer member including a release layer, a pattern layer, and an adhesive layer which are sequentially stratified on the substrate sheet having a surface preliminarily matted by a process such as sand blasting, i.e. defining an irregular surface, or chemical etching; or a transfer member including a release layer, a pattern layer, and an adhesive layer which are sequentially stratified on the substrate sheet which is constructed to form by printing, on a surface preliminarily lustered, a projected and recessed layer, by use of a material such as a loading pigment, having a finely projected and recessed surface.

After completing adhesion of the transfer layer of the mat transfer member to the molded member, either the substrate sheet or the substrate sheet together with the projected and recessed layer are stripped off and removed therefrom. The projections and recesses of the substrate sheet or the projected and recessed layer thereby are transferred onto the release layer to form fine projections and recesses on the surface of the release layer, and as a result, the surface of the in-mold molded product is matted.

Nevertheless, the molded product produced by employing the in-mold molding process described above has proved to have poor surface-wear characteristics because streaks easily can be generated merely by scratching the matted surface by a fingernail. Likewise, there is the problem that fingerprints will remain on the matted surface without being erased at all. Probably this is because a stain such as caused by sebum from the skin of a finger adheres to the matted surface of the molded product to vary the light scattering effect on the fine projections and recesses in the matted regions, thus eventually varying the matted effect. This is a phenomenon similar to that which occurs when water drops on a ground glass surface wherein a certain difference is generated between a region without water and a matted region holding water. Therefore, conventionally, although it is desired to provide matted designs on in-mold molded products, such designs cannot practically be applied to any objects that will be within easy access of human fingers because of fear of substantial degradation of the matted effect caused by adhered stains.

Furthermore, since the fine projections and recesses provided for the in-mold molded product are fully merged by the thickness of the mat transfer member itself, the matted effect cannot fully be provided on surfaces of those inserted molded pieces produced by employing an in-mold molding unit grained by an etching process and a conventional transfer member.

The object of the present invention is to fully resolve the problems described above by providing a novel in-mold molding product having excellent surface-wear characteristics and having a surface fully matted and resistant to stain, and by providing a novel method for manufacturing such products.

SUMMARY OF THE INVENTION

To achieve the above object, the present invention provides an in-mold molded product with a matted surface and having, on a surface of projections and recesses of a plastic molded member, a transfer layer having projections and recesses finer than those of the plastic molded member.

Also provided is a method for manufacturing an in-mold molded product in which there is used a mat transfer sheet or member having fine projections and recesses for producing a matted effect, and a mold unit having a portion defining a cavity and having projections and recesses larger than those of the mat transfer member. The mat transfer member is secured inside of the mold unit and then resin is injected to carry out an in-mold molding operation.

When the mat transfer member is positioned in the mold unit and then injection is conducted, a substrate sheet of the mat transfer member will not contact lower projections and shallow recesses of the mold unit, due to the thickness of the substrate sheet. Thus, the tips of all the projections of the molded member formed during molding remain rounded. This permits generation of a matted surface which is completely free from being subjected to superficial damage. Furthermore, since the surface of the transfer layer of the mat transfer member has very fine projections and recesses, this provides a very satisfactory matted effect.

DETAILED DESCRIPTION OF THE INVENTION

Figure 1:
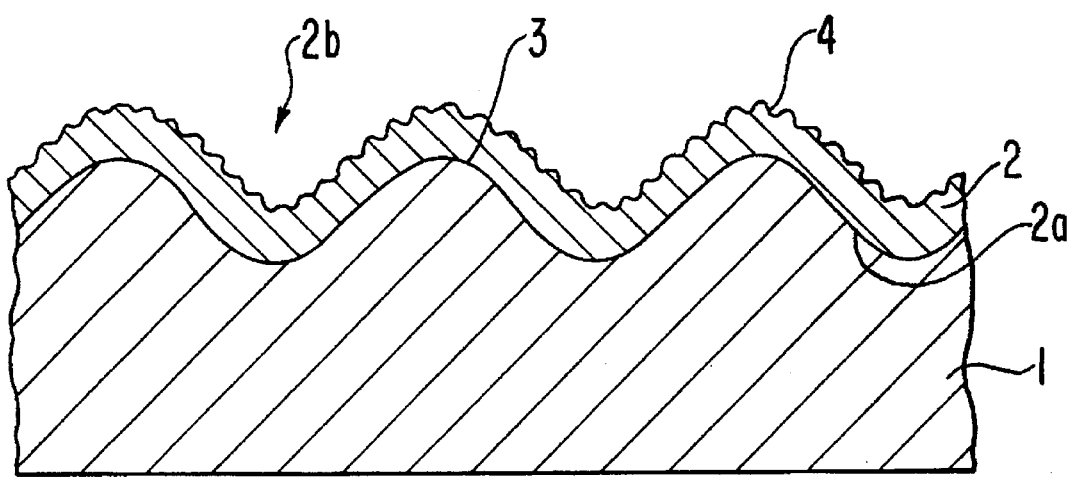
FIG. 1 is a sectional view of an in-mold molded product having a matted surface according to the present invention.
Figure 2:
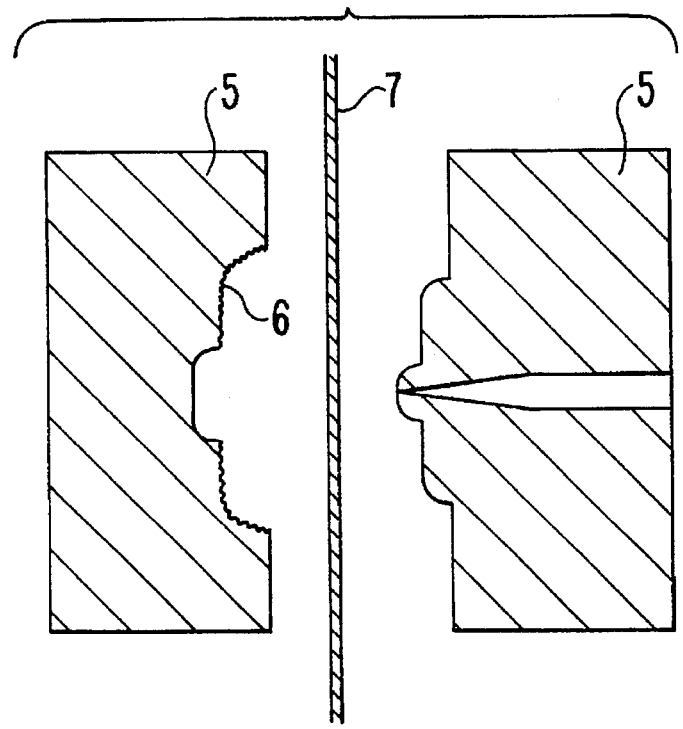
FIGS. 2 and 3 are respective sectional views showing a method of manufacturing the in-mold molded product having the matted surface.
Figure 3:
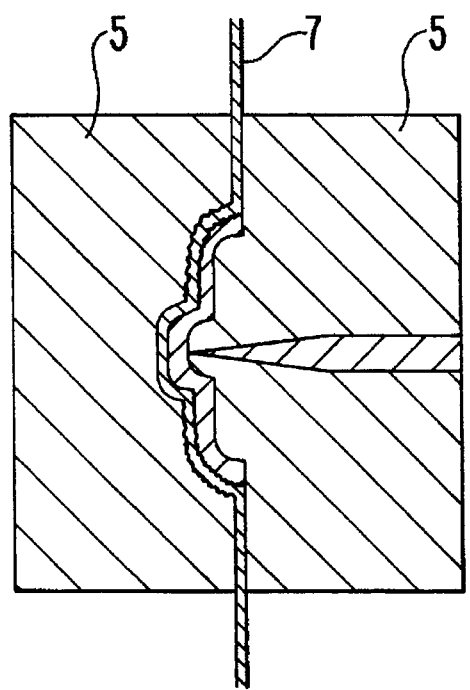

Referring to the drawings, the present invention will be described in detail.

A mat transfer sheet or member 7 has a transfer layer 2 formed of a releasable layer 9, a pattern layer 10, and an adhesive layer 11, which are sequentially formed on a substrate sheet 8 constituting the remainder of the transfer member 7. The mat transfer member 7 is capable of generating a matted pattern or functional thin film on a surface of a desired in-mold molded member by transfer of transfer layer 2 to the member.

Figure 4:
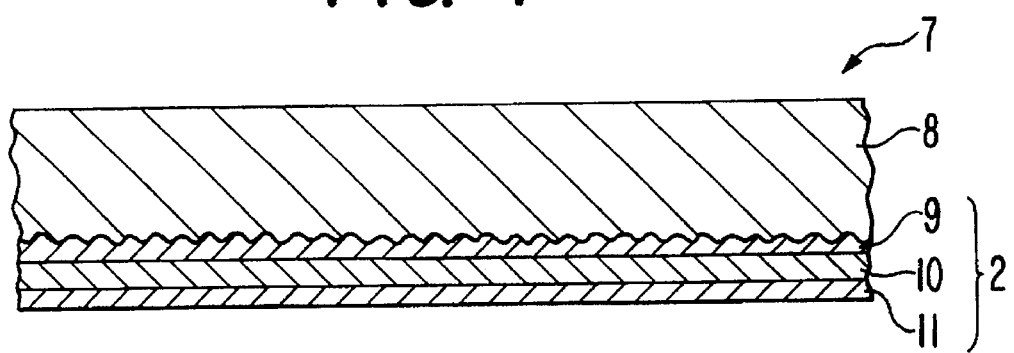
FIGS. 4 and 5 are respective sectional views of mat transfer members for use in the method of the present invention.
Figure 5:
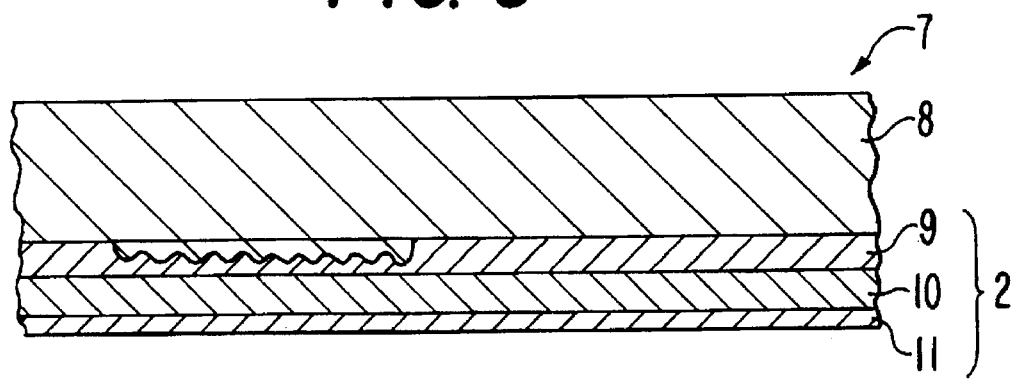

The substrate sheet 8 of the mat transfer member 7 is provided on a surface thereof with matted fine projections and recesses. For example, the substrate sheet 8 can be a sheet normally usable for a transfer member and made of any plastic film such as polyethylene terephthalate film, polypropylene film, polyethylene film, nylon film, or cellophane film, or a composite film consisting of plastic film and paper. Next, a layer with projections and recesses is formed on the substrate sheet 8 and fixed thereto. For example, the substrate sheet 8 may be superficially coated with a resinous layer containing fine powder particles of silica, calcium carbonate, polyethylene wax, or glass beads, by using a printing process. Not only thermoplastic resin, melamine resin, or epoxy resin, or any of those which are curable by irradiating ultraviolet rays or electronic rays such as methyl methacrylate, may also be used for composing the resinous layer for coating the substrate sheet 8. The substrate sheet 8 may also contain a fine powder of materials which can be mixed into the above plastic film during plastic film formation. Alternatively, the substrate sheet 8 may be composed of any of the above plastic film materials and have projections and recesses which are formed by subjecting the surface of the above-described plastic film to a physical treatment such as a sand blasting process or a chemical etching process. The layer with projections and recesses thus defines an irregular mat on the substrate 8. The matted regions may he foraged on the entire surface of the substrate sheet 8 (FIG. 4) or in local regions (FIG. 5) so that matted and lustered regions can be displayed by effectively combining a pattern with designs such as the shape of the molded product.

The release layer 9 is provided on the entire surface of the substrate sheet 8. After completing the transfer process, the substrate sheet 8 is stripped from the release layer 9. As a result, in correspondence with the projections and recesses formed on the surface of the substrate sheet 8, fine projections and recesses 4 opposite those of the substrate sheet 8 are formed on the entire surface of the release layer 9 to form a fine matted surface. After completing the transfer process, the release layer 9 itself makes up the fine matted surface on the desired molded product, and thus the release layer 9 also functions to protect the transfer layer 2. The release layer 9 is formed on the substrate sheet 8 by use of any conventional printing means such as a roll-coating process, a gravure printing process, or a screen printing process. Thermoplastic resin such as acrylic resin or polyvinyl resin may be employed as the release layer 9. In order to fully function as a protective layer, the release layer 9 may also be composed of thermosetting resin such as polyurethane resin or epoxy resin, or any of those resins curable by ultraviolet rays or electronic rays, such as methyl methacrylate.

The adhesive layer 11 secures the transfer layer 2 of the mat transfer member 7 to a member to which the transfer layer is to be transferred, i.e. a molded member. Adhesive layer 11 may be composed either of a thermosensitive resin or a pressure-sensitive resin compatible with the material of a desired molded plastic member 1 serving as the member to which the transfer layer is to be transferred. For example, if the member to which the transfer layer is to be transferred is made from AS (acrylonitrile-styrene) resin, then either acrylic resin or polyvinyl resin is suitable for adhesive layer 11. On the other hand, if the member to which the transfer layer is to be transferred is made from polypropylene resin, then either chlorinated polypropylene resin or ethylene-vinyl acetate copolymer resin is suitable for adhesive layer 11.

An arbitrary pattern layer 10 or an evaporated metallic layer is provided between the release layer 9 and the adhesive layer 11, covering the entire surface or local regions as required for a particular design. The pattern layer 10 is formed by any conventional printing means such as a gravure printing process or a screen printing process using ink composed of resin containing either pigment or dye and a variety of additives. The evaporated metallic layer is provided in order to make visually appealing the sense of the matted effect provided by the fine projections and recesses 4 formed on the surface of the release layer 9. The evaporated metallic layer can be generated by evaporating metal such as aluminum, chromium, or nickel by employing a vacuum deposition process, an ion plating deposition process, or a sputtering process, for example.

If it is deemed necessary to promote compatibility of the above components, then a pre-anchor layer may be provided between the release layer 9 and the evaporated metallic layer. If the layer forming of the projections and recesses is provided below such pre-anchor layer, the matting effect is reduced. Furthermore, in order to promote adhesion between the evaporated metallic layer and the adhesive layer 11, a post-anchor layer may be provided therebetween as required.

The materials of the release layer 9, the pattern layer 10, the layer forming the projections and recesses, the evaporated metallic layer, the adhesive layer 11, and the pre-anchor and post-anchor layers preferably are selected to provide excellent adhesion between the adjacent layers.

A mold unit for executing the in-mold molding operation is composed of movable and stationary mold components 5. The mat transfer member 7 is secured to the movable mold component. A cavity 6 is defined within the mold unit by closing the movable and stationary mold components 5. Projections and recesses are provided on the product-side surface of the movable mold component 5 which is in contact with the mat transfer member 7 held in the cavity 6. Such projections and recesses are larger than the projections and recesses 4 discussed above and formed on the mat transfer member 7 and form a coarse matted surface. Resinous material for molding the product is not brought directly into contact with the surface of the movable mold component defining part of the cavity 6, but rather the mat transfer member 7 is held between the movable and stationary mold components 5. Thus, if excessively fine projections and recesses are provided, the projected and recessed surface cannot be formed on the surface of the molded product.

An in-mold molding operation is executed by applying the mat transfer member 7 to the mold unit. First, the mat transfer member 7 is secured to a predetermined position relative to the mold unit. If the fine matted surface is to be formed in local regions, the sections of both the mat transfer member 7 and the mold unit that have projections and recesses are correctly matched with each other by the use of a film feeding device having a positioning mechanism. Next, the mold unit is closed and then the selected resinous or plastic material is injected. The injected material forces the mat transfer member against the projections and recesses of the mold. This deforms the mat transfer member over such projections and into such recesses. As a result, opposite inner and outer sides of the mat transfer member have projections and recesses. These projections and recesses 2a of the inner side of the mat transfer member mold the plastic material and, when the plastic material hardens, define a surface of a molded plastic member 1 that is rigid with such inner side and that has projections and recesses 3 that are complementary to the recesses and projections, respectively, of the inner side. After cooling of the injected resin, the mold unit is opened to extract the molded piece therefrom. Next, the substrate sheet 8 of the mat transfer member 7 is stripped from the molded piece. The transfer layer 2 thus remains rigid with the molded member 1 and has an outer side having coarse projections and recesses 2b that correspond to projections and recesses 3 of molded member 1. Projections and recesses 2b define a coarse matted contour, and projections and recesses 4 are distributed throughout projections and recesses 2b and define a fine matted contour superimposed on the coarse matted contour. Thus, an in-mold molded product having a fine matted surface superimposed on a coarse matted surface is produced, thereby defining a lusterless finish of the product.

In this way, the mat transfer member 7 provides very fine projections and recesses 4 as a fine matted surface on the coarse matted surface defined by projections and recesses 2b that are formed on the molded piece produced by the mold unit. The tips of all projections of the projections and recesses 2b and 3 formed by the mold unit are rounded because the thickness of the substrate sheet 8 prevents the substrate sheet 8 from contacting lower projections and shallow recesses of the projections and recesses of the mold unit. Particularly, as the transfer member 7 is pressed toward the projections and recesses of the mold, and since the substrate sheet is prevented from being molded into contact with the bottoms of the mold recesses, the configuration of the outer surface of the transfer member 7 under such condition will be that it will have plural projections and recesses that are formed by a continuous surface including surface portions that merge smoothly, i.e. that join without formation of intersecting surfaces. By virtue of the round tips of the projections and recesses 2b and 3 formed by the mold unit 5, the entire matted surface will remain free from superficial damage, thus surely producing a damage-free matted surface. The surface of the transfer layer 2 formed by the mat transfer member 7 has very fine projections and recesses 4, thus providing a very satisfactory fine matted surface effect superimposed on the coarse matted surface.

Specific results from execution of the in-mold molding method embodied by the invention are described below.

First Embodiment

A mat transfer member was secured in a mold unit having coarse matted surface recesses about 0.3–50 microns deep. An in-mold molding operation was performed using AS (acrylonitrile-styrene resin) resin under the following injection conditions. The molded product proved to be resistant to superficial damage and stains and fully retained a matted effect.

| Injection Conditions (Molding Machine J-1505A Manufactured by Nippon Seikohsho Co., Ltd. | |
| --- | --- |
| Mold Temperature: | 50° C. |
| Cylinder Temperature: | 220° C. |
| Injection pressure: | 1,190 kg/cm$^2$ |
| Retained pressure: | 850 kg/cm$^2$ |
| Number of rotations of screw: | 55 rpm |

The injection speed was maximized in the molding machine.

Second Embodiment

A mat transfer member was secured in a mold unit having coarse matted surface recesses about 0.3–50 microns deep. The mat transfer member included a substrate sheet 38 microns thick having a dual-phase fine matted surface effect. An in-mold molding operation was conducted using AS resin. The molded product had a dual-phase matted effect in local regions and produced a surface with fully satisfactory physical properties and lustered regions and a noticeable design effect.

Third Embodiment

A mat transfer member was secured in a mold unit having coarse matted surface recesses about 50–300 microns deep and formed by an etching process. The mat transfer member included a substrate sheet 38 microns thick and having a dual-phase fine matted surface effect. An in-mold molding operation was conducted using AS resin. The molded product had a dual-phase matted effect in local regions and produced a surface with fully satisfactory physical properties and lustered regions and a noticeable design effect.

As is clear from the above description, the in-mold molded product with the matted surface embodied by the invention provides a transfer layer containing finer projections and recesses on a projected and recessed surface of the plastic molded product, the projections and recesses of the transfer layer being finer than those of the plastic molded member. Thus, projections and recesses having dual-phase sizes are formed on the plastic molded product. Therefore, the in-mold molded product is resistant to superficial damage and has a stain-free quality surface with an excellent matted effect.

The method for manufacturing the in-mold molded product with the matted surface embodied by the invention employs the use of both a mat transfer member capable of forming fine projections and recesses for producing a matted effect and a mold unit having projections and recesses larger than those of the mat transfer member. The mat transfer member is secured inside of the mold unit, and then resin is injected to perform the in-mold molding operation. Thus, the above-described in-mold molded product easily can be produced.

What is claimed is:

1. An in-mold molded product having on at least a portion of the exterior thereof a lusterless finish that is scratch-resistant and stain-resistant, said product comprising:

a molded plastic member having a surface defined by projections and recesses that merge smoothly;

a transfer layer having inner and outer opposite sides, said inner side being rigid with said surface and conforming to said projections and recesses thereof, such that said outer side has first projections and recesses that merge smoothly, that correspond to said projections and recesses of said surface and that define a coarse matted contour, said outer side further having in at least one region thereof second projections and recesses smaller than said first projections and recesses, said second projections and recesses being distributed throughout said first projections and recesses and defining a fine matted contour superimposed on said coarse matted contour; and said coarse matted contour and said fine matted contour superimposed thereover together defining said lusterless finish that is scratch-resistant and stain-resistant.

2. A product as claimed in claim 1, wherein said inner side of said transfer layer includes an adhesive layer securing said transfer layer to said surface of said member.

3. A product as claimed in claim 1, wherein said outer side of said transfer layer includes another region that is free of said second projections and recesses.

4. A product as claimed in claim 1, wherein tips of said first projections are rounded.

5. A method for manufacturing an in-mold molded product having on at least a portion of the exterior thereof a lusterless finish that is scratch-resistant and stain-resistant, said method comprising:

providing a mold unit having therein a cavity defined partially by a mold surface having coarse projections and recesses;

providing in said cavity a transfer sheet having at an inner side thereof a transfer layer and having at an outer side thereof a substrate sheet with said substrate sheet directed toward said mold surface, said transfer layer having inner and outer sides with said outer side having in at least one region thereof fine projections and recesses;

injecting plastic material into said cavity at said inner side of said transfer layer, and causing said plastic material to urge said transfer sheet including said transfer layer and said substrate sheet toward said mold surface, such that said transfer layer and said substrate sheet are caused to deform into said recesses and over said projections of said mold surface, thereby forming at said inner and outer sides of said transfer layer corresponding coarse projections and recesses that merge smoothly and that are larger than said fine projections and recesses;

hardening said plastic material to thereby form a molded plastic member having a surface that is rigid with said inner side of said transfer layer and that is defined by projections and recesses that merge smoothly and that are molded by said recesses and projections, respectively, at said inner side of said transfer layer, thereby forming said product as the thus hardened molded plastic member and said transfer layer rigid therewith and with said lusterless finish that is scratch-resistant and stain-resistant defined by a fine matted contour formed by said fine projections and recesses of said outer side of said transfer layer being superimposed on a coarse matted contour formed by said coarse projections and recesses at said outer side of said transfer layer, with said fine projections and recesses being distributed throughout said coarse projections and recesses;

removing said product from said mold unit; and removing said substrate sheet from said transfer layer.

6. A method as claimed in claim 5, wherein said transfer sheet further is provided at said inner side of said transfer layer with an adhesive layer that secures said transfer layer to said surface of said member during said hardening.

7. A method as claimed in claim 5, comprising providing said outer side of said transfer layer with another region that is free of said fine projections and recesses.

8. A method as claimed in claim 5, comprising, during urging of said transfer sheet toward said mold surface, preventing said substrate sheet from contacting bottoms of said recesses of said mold surface, and thereby causing tips of said coarse projections at said outer side of said transfer layer to be rounded.

9. A method as claimed in claim 5, wherein said providing said transfer sheet in said cavity comprises forming said substrate sheet to have inner and outer sides with said inner side thereof having fine recesses and projections, forming said transfer layer on said inner side of said substrate sheet such that said fine projections and recesses in said outer side of said transfer layer are formed by the contour of said fine recesses and projections, respectively, of said inner side of said substrate sheet, and then positioning said transfer sheet in said cavity with said outer side of said substrate sheet directed toward said mold surface.

10. A product as claimed in claim 1, wherein said outer side of said transfer layer comprises a release layer formed of a protective material.

11. A product as claimed in claim 10, wherein said transfer layer further comprises a pattern layer positioned between said release layer and said surface.

12. A method as claimed in claim 5, comprising providing said outer side of said transfer layer as a release layer formed of a protective material.

13. A method as claimed in claim 12, further comprising providing said transfer layer with a pattern layer positioned between said release layer and said surface.

14. A method as claimed in claim 7, further comprising, during said providing said transfer sheet in said cavity, aligning said at least one region of said outer side of said transfer layer having said fine projections and recesses with a corresponding region of said mold surface having said coarse projections and recesses.

* * * * *